United States Patent [19]

Tattermusch

[11] Patent Number: 4,958,863
[45] Date of Patent: Sep. 25, 1990

[54] TRIANGULAR SWINGING ARM FOR WHEEL SUSPENSIONS OF MOTOR VEHICLES

[75] Inventor: Peter Tattermusch, Esslingen, Fed. Rep. of Germany

[73] Assignee: Daimler-Benz AG, Stuttgart, Fed. Rep. of Germany

[21] Appl. No.: 302,317

[22] Filed: Jan. 26, 1989

[30] Foreign Application Priority Data

Feb. 4, 1988 [DE] Fed. Rep. of Germany ....... 3803216

[51] Int. Cl.⁵ ........................... B60G 7/00; B60G 3/20
[52] U.S. Cl. .................................. 280/696; 280/670; 280/724
[58] Field of Search ............... 280/666, 670, 696, 701, 280/724, 725, 726

[56] References Cited

U.S. PATENT DOCUMENTS

| 4,087,116 | 5/1978 | Morimoto | 280/724 |
| 4,717,171 | 1/1988 | Kami et al. | 280/696 |

FOREIGN PATENT DOCUMENTS 2305449 8/1974 Fed. Rep. of Germany.

*Primary Examiner*—Kenneth R. Rice
*Attorney, Agent, or Firm*—Evenson, Wands, Edwards, Lenahan & McKeown

[57] ABSTRACT

A triangular swinging arm loaded via a bearing spring is of nonintegral design and the supporting arm on which the bearing spring is situated is supported with respect to the other, second arm of the triangular swinging arm via two mutually spaced joints.

7 Claims, 1 Drawing Sheet

U.S. Patent  Sep. 25, 1990  4,958,863 ic arm for wheel suspensions of motor vehicles, in particular passenger vehicles, said triangular swinging arm being supported against the bodywork via a bearing spring and being constructed of two mutually angled arms, which are each provided with articulated mountings on the bodywork and one of which forms a supporting arm and is connected in articulated fashion in the vicinity of the wheel to the other arm, on which the wheel carrier is articulated.

Triangular swinging arms in the form of essentially rigid triangular swinging arms as well as of nonintegral design are known. In their forms as hitherto known, both designs are affected by fundamental disadvantages.

With regard to the longitudinal spring action, i.e. with regard to loads in the longitudinal direction of the vehicle, the fulcrum of the swinging arm in the case of essentially rigid triangular swinging arms is determined by the hardness of the customarily resilient articulated mounting points on the bodywork and is in general in the region between these articulated mounting points. Taking into consideration acceptable bearing loads, the possible longitudinal spring action is relatively small and, in conjunction with the track rod position, which is in general determined by other structural conditions, tracking errors due to the kinematic elasticity are unavoidable.

For an essentially rigid triangular swinging arm (German Published Unexamined Pat. Application - DE-OS-No. 2,305,449), it is known that such can be constructed from two rigidly connected arms, one of which forks in the direction of the other and is rigidly connected to the other arm via its two fork ends. Compared to swinging arms constructed using sheet metal welding, this makes possible a slimmer, space-saving construction and greater freedom of construction.

In the case of triangular swinging arms of nonintegral design, of the type assumed at the outset to be known, the nonintegral design results in greater restrictions as regards the position of the spring, if the spring is to be supported on the triangular swinging arm, since the force of the spring must run through the line of action of the respective swinging arm supporting it. This in turn imposes considerable restrictions on this spring-carrying swinging arm as regards the position of its articulated mounting points and hence restrictions on the freedom of construction.

An object of the invention is to further develop a triangular swinging arm of the type mentioned at the outset such that, on the one hand, the freedom of construction as regards the arrangement of the spring is the same as that in the case of rigid triangular swinging arms but that, on the other hand, the advantages of nonintegral triangular swinging arms as regards the longitudinal spring action are retained.

According to the invention, this is achieved by the fact that the supporting arm carries the spring and is additionally supported yieldingly against the other arm in a manner laterally offset with respect to the connecting line between its articulated joints on the other arm and bodywork.

In this type of design, the spring can be situated outside the line of action between the articulated joints of the supporting arm, since the resulting moment about the line of action is taken up by the additional support relative to the other arm, said support being outside the line of action. Great freedom in the design of the supporting arm is thereby obtained and, as a result, also with regard to the arrangement of the spring. However, the fundamental advantage of the nonintegral design in respect of the kinematic elasticity behaviour of the axle is retained as well, and an adequate longitudinal spring action can be achieved. Even in the case of structural limitations with regard to the position of the track rod, a triangular swinging arm of this kind thus permits the realization of desired tracking changes.

A preferred embodiment of the solution according to the invention consists in that the supporting arm extends essentially in the longitudinal direction of the vehicle. The arm supporting the supporting arm, in contrast, has a more transversely directed extension. This is favourable in particular for front wheels.

However, within the scope of the invention it is also contemplated to arrange the supporting arm and the arm supporting the latter in a reversed arrangement, which would, for example, be of advantage for rear wheels.

Other objects, advantages and novel features of the present invention will become apparent from the following detailed description of the invention when considered in conjunction with the accompanying drawings.

DETAILED DESCRIPTION OF THE DRAWINGS

Figure 1:
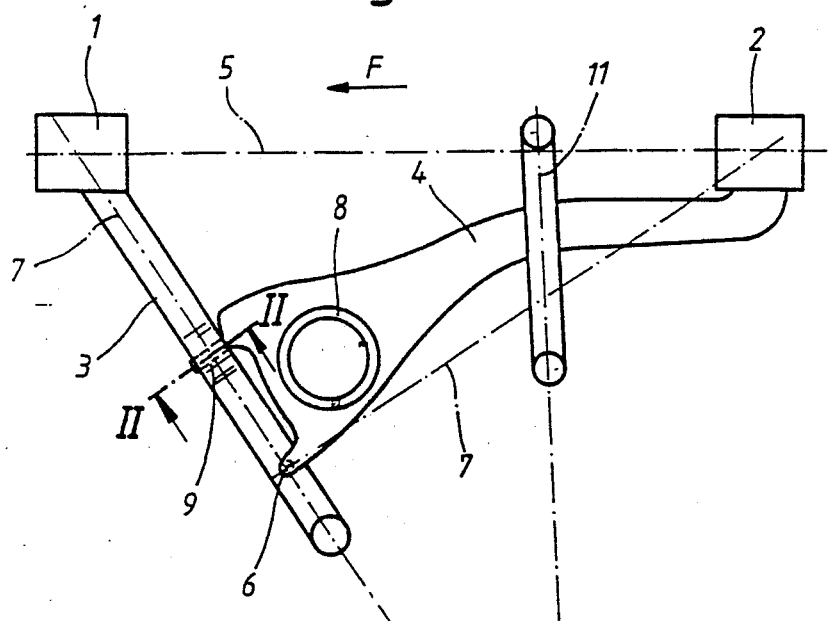
FIG. 1 is a schematic plan view of a triangular swinging arm of nonintegral design constructed in accordance with a preferred embodiment of the present invention.
Figure 2:
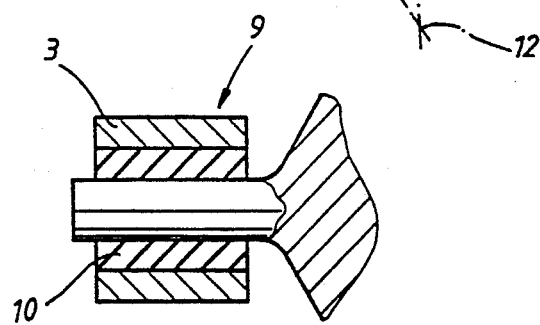
FIG. 2 is an enlarged view taken along section line II—II in FIG. 1.

In the plan view according to FIG. 1, arrow F symbolises the direction of forward movement of a vehicle, to the bodywork of which the schematically represented triangular swinging arm is attached via articulated mountings 1 and 2. The articulated mountings are formed by conventional resilient bearings, so that the arms 3 and 4 of the triangular swinging arm can move in articulated fashion within certain limits relative to the articulated mountings 1 and 2. Together, the articulated mountings 1 and 2 define the swivelling axis of the triangular swinging arm, which is designated 5 and about which the triangular swinging arm swivels during spring action.

The triangular swinging arm can serve as the lower triangular swinging arm of a wheel suspension comprising a lower and an upper swinging arm but can also represent the lower guide for a shock absorber strut shaft, where the spring is supported on one of the arms.

In the exemplary embodiment, the forward arm 3 essentially forms a transverse swinging arm, while the rearward arm 4, relative to the direction of travel F, forms a supporting arm, the orientation of which is more in the longitudinal direction of the vehicle. The supporting arm 4 is connected to the transverse arm 3 via a joint 6 which, together with the articulated joint 2 on the bodywork, define the line of bearing and action 7 of the supporting arm 4, the shaping of which is in other respects a matter of free choice and, as shown in the exemplary embodiment according to FIG. 1, can extend in a manner laterally offset with respect to the line of action.

If the spring 8 is arranged on the supporting arm 4 so as to be laterally offset with respect to the line of action 7, then the supporting arm is additionally connected to the arm 3 via a resilient joint 9, this joint 9 expediently being offset in the same direction with respect to the line of action 7 as the spring 8. This is expedient because it results in a small overall volume for the supporting arm. However, the moment with respect to the line of action, due to the spring 8, can also be taken up by a joint arranged offset in the opposite direction with respect to the line of action 7.

The joint 9 can be axially soft, since, in accordance with the line of action 7, the longitudinal forces are taken up by the joint 6, which is firm in the longitudinal direction, and the articulated mounting 2. Overall, sufficient resilience is to be provided for the joint 9, for example by means of a resilient bushing 10, to enable the geometrically inevitable deformations entailed with this arrangement to be taken up resiliently and to ensure that the support via the joint 9 does not restrict the longitudinal yield of the open triangular linkage to an impermissible degree.

With respect to longitudinal forces, the fulcrum of the swinging arm linkage of such a triangular swinging arm is situated essentially in articulated mounting 1. In this arrangement, the position of this articulated mounting is virtually independent of the position of the spring, and this results in great freedom regarding the arrangement of the spring, on the one hand, and the position and design of the arms 3 and 4, on the other hand. Furthermore, it is possible to achieve a relatively great longitudinal resilience, and good coordination with a view to a desired tracking behaviour is possible even when, with regard to the track rod 11 (here only indicated), the other conditions on the vehicle necessitate a predetermined position, 4, by virtue of the freedom in terms of construction regarding the choice of the position of articulated mounting 1 and 2, in particular of articulated mounting 1, when the possibility is opened up of correspondingly shifting the position of the pole 12, said position being determined by the line of action 13 of the transverse arm 3 and the axis of the track rod 11.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Triangular swinging arm arrangement for wheel suspensions of motor vehicles, in particular passenger vehicles, said triangular swinging arm being supported against vehicle bodywork via a bearing spring and being constructed of two mutually angled arms, which are each provided with articulated mountings on the bodywork and one of which forms a supporting arm and is connected in articulated fashion in the vicinity of the wheel to the other arm, on which the wheel carrier is articulated, wherein the supporting arm carries a spring and is additionally supported yieldingly against the other arm in a manner laterally offset with respect to a connecting line between articulated mountings on the other arm and the bodywork.

2. Triangular swinging arm arrangement according to claim 1, wherein the supporting arm extends essentially in the longitudinal direction of the vehicle.

3. Triangular swinging arm arrangement according to claim 1, wherein the other arm supporting the supporting arm extends essentially in the transverse direction of the vehicle.

4. Triangular swinging arm arrangement according to claim 2, wherein the other arm supporting the supporting arm extends essentially in the transverse direction of the vehicle.

5. Wheel suspension arrangement for supporting a vehicle wheel at vehicle body work, comprising:
   a first support arm pivotally connected at its laterally inward end to the vehicle body work at a first pivot connection and at its laterally outward end to a second pivotal connection with a wheel carrier,
   a second support arm pivotally connected at its laterally inward end to the vehicle body work at a third pivot connection spaced longitudinally from the first pivotal connection, a lateral outer end portion of the second support arm being pivotally connected to the first support arm at a fourth pivot connection disposed intermediate the first and second pivotal connection to form a triangular swinging wheel support arrangement,
   an elastically yielding connection of the lateral outer end portion of the second support arm to the first support arm at a fifth connection laterally offset with respect to a connecting line between the third and fourth pivotal connections,
   a spring supported between the second support arm and the vehicle body work, said spring being located on the second support arm at a location laterally offset from the connecting line between the third and fourth pivotal connections,
   whereby the provision of the elastically yielding fifth connection facilitates locating of the spring at various locations laterally offset from the connecting line between the third and fourth pivot connections.

6. Wheel suspension according to claim 5, wherein the first support arm extends essentially in the transverse direction of the vehicle.

7. Wheel suspension according to claim 6, wherein the second support arm extends essentially in the longitudinal direction of the vehicle.

* * * * *